(12) United States Patent
Goris et al.

(10) Patent No.: US 11,298,644 B2
(45) Date of Patent: Apr. 12, 2022

(54) DRAINAGE MEDIUM FOR GAS FILTER

(71) Applicant: ATLAS COPCO AIRPOWER, NAAMLOZE VENNOOTSCHAP, Antwerpen-Wilrijk (BE)

(72) Inventors: Ken Goris, Antwerpen-Wilrijk (BE); Jo Wouters, Antwerpe-Wilrijk (BE); Evi Marcel J. Bultinck, Antwerpe-Wilrijk (BE); Isabelle Denise M. De Wolf, Antwerpen-Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 143 days.

(21) Appl. No.: 16/620,558

(22) PCT Filed: Jun. 12, 2018

(86) PCT No.: PCT/IB2018/054230
§ 371 (c)(1),
(2) Date: Dec. 9, 2019

(87) PCT Pub. No.: WO2018/229644
PCT Pub. Date: Dec. 20, 2018

(65) Prior Publication Data
US 2020/0155991 A1    May 21, 2020

(30) Foreign Application Priority Data
Jun. 12, 2017    (BE) .................................. 2017/5421

(51) Int. Cl.
*B01D 46/00* (2022.01)
(52) U.S. Cl.
CPC ..... *B01D 46/0031* (2013.01); *B01D 46/0047* (2013.01); *B01D 2201/184* (2013.01);
(Continued)

(58) Field of Classification Search
CPC ................ B01D 46/00; B01D 46/0031; B01D 46/0047; B01D 46/2418; B01D 46/42;
(Continued)

(56) References Cited

U.S. PATENT DOCUMENTS

| 4,050,237 A | 9/1977 | Pall et al. |
| 4,231,768 A | 11/1980 | Seibert et al. |

(Continued)

OTHER PUBLICATIONS

International Search Report and Written Opinion PCT Application No. in corresponding PCT Application No. PCT/IB2018/054230, dated Aug. 22, 2018.

(Continued)

*Primary Examiner* — Jonathan Miller
*Assistant Examiner* — Gabriel E Gitman
(74) *Attorney, Agent, or Firm* — Bacon & Thomas, PLLC

(57) ABSTRACT

A coalescence filter including an inlet for supplying the gas to a filter element present in the coalescing filter, which filter element includes a coalescence medium for coalescing at least one disperse liquid phase during a displacement of a gas through the coalescence medium in a flow direction. The filter element downstream of the coalescence medium includes a drainage medium for draining the at least one coalesced disperse phase leaving the coalescence medium. The filter element contains a barrier layer positioned downstream of the coalescence medium, where the coalescence medium and the barrier layer are held at a distance from each other by one or more spacers to provide a drainage zone in the drainage layer of a drainage medium between a surface of the coalescence medium facing the barrier layer and the barrier layer for draining the coalesced disperse phase in a drainage direction.

20 Claims, 7 Drawing Sheets

(52) U.S. Cl.
CPC ........... *B01D 2239/0609* (2013.01); *B01D 2239/0613* (2013.01); *B01D 2239/1208* (2013.01); *B01D 2239/1216* (2013.01); *B01D 2239/1258* (2013.01); *B01D 2258/06* (2013.01)

(58) Field of Classification Search
CPC ...... B01D 2201/184; B01D 2239/0609; B01D 2239/0613; B01D 2239/1208; B01D 2239/1216; B01D 2239/1258; B01D 2258/06; B01D 17/045
See application file for complete search history.

(56) References Cited

U.S. PATENT DOCUMENTS

| | | | |
|---|---|---|---|
| 4,878,929 A | 11/1989 | Tofsland et al. | |
| 5,129,923 A | 7/1992 | Hunter et al. | |
| 6,419,721 B1 | 7/2002 | Hunter | |
| 8,114,183 B2* | 2/2012 | Schwandt | B01D 46/521 55/498 |
| 2006/0207234 A1* | 9/2006 | Ward | B01D 39/163 55/524 |
| 2011/0124941 A1* | 5/2011 | Verdegan | B01D 17/0211 585/818 |
| 2011/0168621 A1 | 7/2011 | Wieczorek et al. | |
| 2011/0233152 A1* | 9/2011 | Wieczorek | B01D 17/045 210/799 |
| 2014/0007771 A1* | 1/2014 | Chase | B01D 46/0031 95/278 |
| 2014/0284264 A1 | 9/2014 | Klein et al. | |
| 2015/0182878 A1 | 7/2015 | Bultinck et al. | |
| 2016/0076418 A1 | 3/2016 | Wall | |
| 2016/0136554 A1 | 5/2016 | Swaminathan et al. | |

OTHER PUBLICATIONS

Written Opinion of the International Preliminary Examining Authority in corresponding PCT Application No. PCT/IB2018/054230, dated Mar. 13, 2019.
International Preliminary Report on Patentability in corresponding PCT Application No. PCT/IB2018/054230, dated Jun. 26, 2019.

* cited by examiner

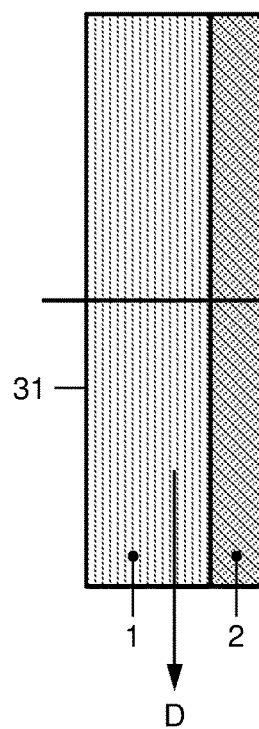
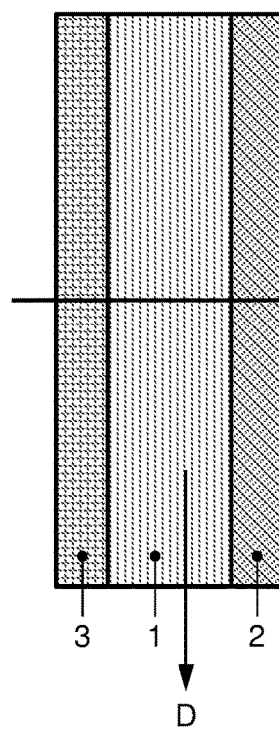
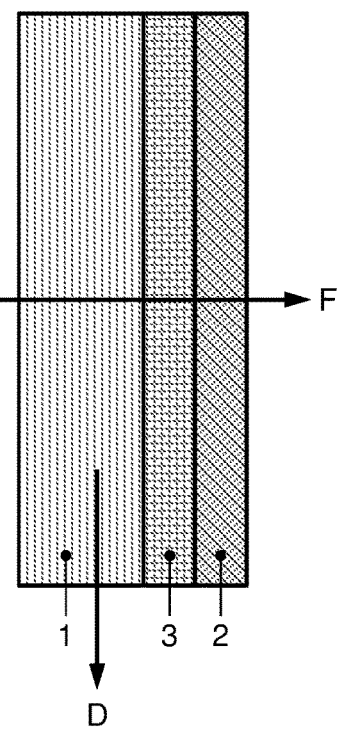
Fig. 2a   Fig. 2b   Fig. 2c
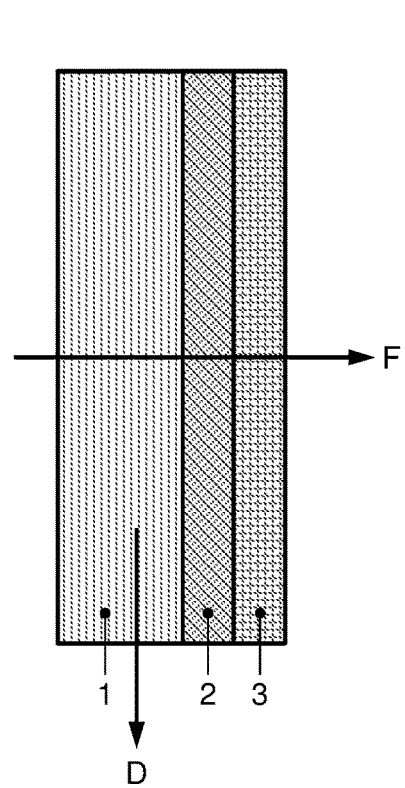
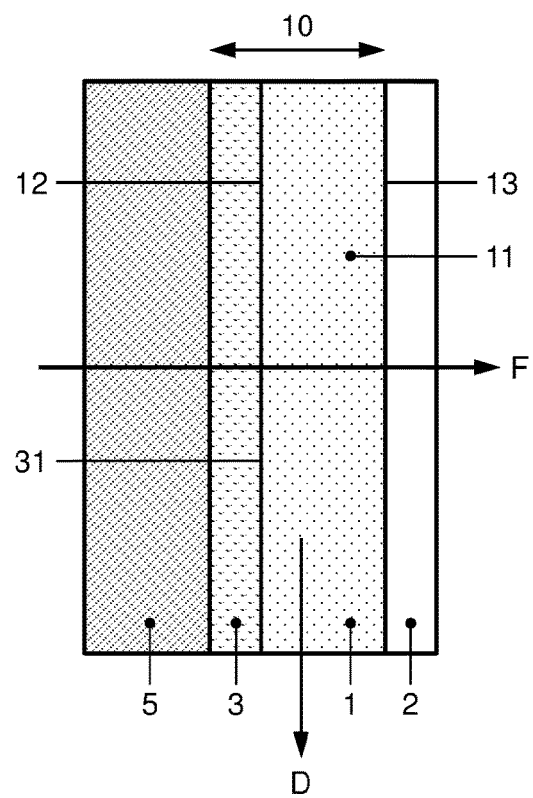
Fig. 2d   Fig. 2e

DRAINAGE MEDIUM FOR GAS FILTER

This invention relates to a gas filter for coalescing at least one dispersed, usually liquid phase present in a gas, the gas filter comprising an inlet for supplying the gas to a filter element present in the gas filter, which filter element comprises a coalescence medium for coalescing the at least one disperse phase during a displacement of the gas through the coalescence medium in a flow direction F, wherein the filter element downstream of the coalescence medium comprises a drainage medium for draining the at least one coalesced disperse phase leaving the coalescence medium in a drainage direction D which is transverse to the flow direction F.

BACKGROUND OF THE INVENTION

Air or other gases leaving a compressor often have a quality that does not meet the requirements set by the process or the application for which they are intended, unless they are adequately pretreated. Examples are impurities present in compressed air or gases, including oil droplets, water droplets, aerosols of oil and/or water, oil vapor, water vapor and the like. Water coolers and dryers are usually used to remove water vapor and to lower the dew point. Gas filters are, for instance, used for coalescing water and/or oil aerosol drops as disperse phase in air as continuous gas phase, followed by the removal of the coalesced droplets. An oil aerosol present in air leaving a compressor often has a droplet size of 0.01 to 50 µm. These oil droplets are typically converted in the gas filter into droplets with a diameter of 5 to 500 µm. The fine glass fibers from which the gas filters are often built up usually have a sufficiently high specific surface area to sufficiently delay the gas and the disperse phase present therein, for instance an aerosol impurity, in order to effect an efficient coalescence.

Practical examples of the use of gas filters include, for instance, the separation of oil aerosols from air coming from air compressors and crankshafts, engine crankcases or gearboxes, the removal of oil from air coming from the outlet of a vacuum pump, the separation of water as the disperse phase from fuel as a continuous phase in fuel-water systems, or the separation of oil as a disperse phase from a water-oil system with water as a continuous phase.

Air entering the filter usually travels radially through a cylindrical coalescent medium to a drainage layer, to be discharged from there. A coalescence medium is usually composed of several layers of material, and usually contains one or more sheets of a microporous fibrous substrate, the internal surface of which is capable of inducing aggregation or coalescence of the disperse phase. Coalescence of the aerosol disperse phase to droplets with increasing droplet size often already occurs in the first layers of the coalescence medium. The disperse phase is transported through the coalescence medium to a macroporous drainage medium adjacent to the coalescence medium, for discharging the coalesced disperse phase from the filter. The downward flow of the coalesced disperse phase usually takes place under the influence of gravitation. After being used for some time, the filter usually reaches a stationary state, in which the accumulation rate of the disperse phase in the coalescence medium corresponds to the drainage rate from the gas filter via the drainage medium.

After having been used for some time, a so-called "wet band" of disperse phase or oil, which remains in the gas filter, is usually formed at the bottom of the gas filter, the height of which can increase during use in such a way that it may overlap with the coalescence medium. The presence of such a wet band can lead to pressure build-up in the filter and to bursting of oil bubbles on the drainage surface, which in turn can cause so-called oil transfer or "oil re-entrainment" or "oil carry over", this is the entrainment of oil droplets through the purified air which originates from the coalescence medium and is leaving the gas filter. This oil transfer is undesirable and can adversely affect filter efficiency.

Various types of materials are used for manufacturing coalescence media, including organic and inorganic fibrous or porous materials. These materials are available in various forms, for example as homogeneous, heterogeneous, layered or folded or coiled or laminated materials, composites, and combinations thereof. Forms suitable for use as coalescent media are typically plate-shaped, tubular, or extruded shapes with a different cross-section. e.g. an elliptic or another simple or complex geometric shape. The separation capacity depends on numerous parameters including the composition and orientation of the fibers in the coalescence medium, the practical conditions, the concentration of the disperse phase in the carrier or continuous phase of the fluid to be purified, the pressure to which the filter material is subjected and the volume of fluid to which the filter is exposed in the course of time.

Attempts to improve the separation ability of a gas filter have so far mainly focused on improving the performance of the coalescence medium, for example by using a coalescence medium with complex fiber structures or complex porous structures.

U.S. Pat. No. 4,231,768 discloses an air filter for separating particles of water and hydrocarbons with a particle size of 0.01-50 µm from compressed air, in which the coalescence medium and the drainage medium are formed as a single unit, to optimize coalescence. The filter contains a two-stage gas filter. The primary coalescence medium of the first stage is composed of a mat of non-woven fibers of low density and relatively high porosity of 90% with pores having a diameter smaller than 0.1 micron. The coalescence medium is formed with a drainage layer of epoxy bonded cellulose fibers into a corrugated material and surrounded by a non-corrugated, flat layer of an open-cell polyurethane foam or a mat of polypropylene fibers. The second filter stage forms a barrier layer arranged at an angle to promote drainage and is made of a porous open cell polyurethane that is coarser than the primary coalescence material. The polyurethane foam contains pores with an average pore diameter of 0.125 to 0.5 mm, and an open volume of at least 80%.

U.S. Pat. No. 4,050,237 describes a demister for use in high pressure systems, with a coalescence medium in which coalescence takes place as well as drainage of coalesced droplets under the influence of gravity. The demister also contains a stripper in polyurethane foam for collecting a residual part of usually larger oil droplets that had not been drained via the coalescence medium, the further coalescing of these drops and the drainage to the bottom of the gas filter under the influence of gravity. The pores in the polyurethane foam have an average diameter between 120 and 500 microns, the foam has a porosity of at least 80% or even 90%. The stripper has a thickness of about 3-6 mm. Because the coalescence medium is embodied as a corrugated material while the stripper is a flat sheet-shaped material, the contact between coalescence medium and stripper as well as the drainage is limited to the crests or tops of the pleats. According to U.S. Pat. No. 4,050,237, a purity of 90-99.99% can be achieved by material optimization to achieve optimum coalescence.

U.S. Pat. No. 4,878,929 also describes a two-stage filter for separating oil present in compressed gas, which aims at optimizing coalescence in the coalescence medium. The first stage is a pleated, multilayer material comprising a coalescence filter and an adjacent downstream disloader section of a multilayer material with a high oil wetting degree to promote oil drainage. Each layer has a Frazier permeability of 30-800. Coalescence mainly takes place in the disloader section. A second filter stage of a non-pleated material facilitates downward flow of the coalesced droplets. The second stage is made of a flat material and arranged at a distance from the first stage, as a result of which the pressure drop across the filter is increased. The second stage has a higher permeability than the coalescence medium and has a thickness of 1.25-2.5 cm.

From US 2016/076418 a filter is known for separating liquid particles with a diameter of 0.1-10 micron from a gas, wherein the filter contains a coarse separating filter, with the aim of optimizing coalescence and facilitate drainage and the flow of the gas to be cleaned. A drainage layer, for example a knit, can be present downstream of the coarse separation filter. Downstream of the coarse separation filter several fine separating filters are present, with a drainage layer between them for absorbing and draining the liquid. The presence of the large number of layers gives rise to pressure build-up over each layer, which is further increased because the layers are arranged at a distance from each other. The drainage layer is made up of a material with capillary properties with respect to the liquid, whereby the formation of a so-called wet band with a height of 2-10 cm is induced. Successive fine separating layers are composed of fibers with a liquid-repellent surface and contain pores with a diameter of typically 30-100 μm and 5-10 μm. Additional drainage and/or spacer layers can be provided upstream and downstream with respect to the fine separating layer.

US-B1-6,419,721 describes a filter for coalescing droplets of an oil mist present in a gas flow. The filter contains a coalescence layer composed of a microfiber material. The filter also contains a drainage layer which has a higher porosity than the coalescence layer. Wicking or a non-woven felt is used as a drainage material. The majority of the fibers are made of an inert material, for example glass fibers or fibers of another inorganic material, which are thermally bonded to each other by means of 10-15 wt. % of meltable two-component polyester fibers. The drainage layer has a surface weight between 100 and 300 g/m² and a thickness between 2 and 10 mm. The fibers of the material of the drainage layer have a thickness of at least 6d.tex. The drainage layer can be composed of one or more material layers. The material of the coalescence medium and the drainage layer may be in contact with each other or arranged at a distance from each other.

US-B1-5,129,923 discloses a filter for coalescing an air flow contaminated with an oil mist, the filter comprising a layer of a coalescence medium built up of a microfibre inorganic material, for example borosilicate glass. Downstream of this layer a second layer of a macro porous polyester drainage material is provided along which coalesced oil can leave the gas filter under the influence of gravitation. The drainage material is impregnated with a hydrofluorocarbon with a low surface energy, with the aim of reducing oil wetting of the surface of the drainage layer and reducing the risk of re-contamination of the air flow with oil.

However, the gas filters disclosed in US-B1-6,419,721 and US-B1-5,129,923 show the disadvantage that they either provide good drainage of the coalesced oil but a sub-optimal oil capture upon entering the drainage layer and thereby limit the performance of the gas filter, or they show a good absorption for the oil when entering the drainage layer, but a sub-optimal drainage, as a result of which a wet band is formed at the bottom of the drainage layer.

SUMMARY OF THE INVENTION

The present invention therefore aims at providing a gas filter which offers a solution to the aforementioned problems and in particular aims to provide a gas filter with improved drainage properties.

In particular, it is an object of the present invention to provide a gas filter comprising a drainage medium showing an improved drainage of the coalesced oil droplets which originate from the coalescence medium.

In particular, the present invention seeks to provide a gas filter which shows a reduced risk of forming the so-called "wet band".

This is achieved according to the present invention with a gas filter having the technical characteristics as described in present specification and drawings.

Thereto, the gas filter of this invention is characterised in that the filter element is composed of a single package of the coalescence medium, the drainage medium and a barrier layer, wherein the barrier layer is located downstream of the coalescing medium, wherein the coalescence medium and the barrier layer are held at a distance from each other by one or more spacers extending in the flow direction (F) to provide a drainage layer in the drainage medium between the barrier layer and a surface of the coalescence medium facing the barrier layer, the coalescence medium, the drainage medium and the barrier layer being layer-like materials positioned adjacent to each other, wherein the pores in the drainage medium have an average pore diameter greater than an average pore diameter of the pores of the barrier layer and greater than an average pore diameter of the pores of the coalescence medium and wherein the drainage medium has a thickness greater than the thickness of the coalescence medium and the thickness of the barrier layer.

Disperse phase in the form of droplets, in particular larger droplets which are present in the fluid as such, but also coalesced droplets formed by coalescence of smaller droplets in the coalescence medium, are transported from the coalescence medium to the drainage medium and usually drain under the influence of gravity, through the drainage medium to the drain, usually in an axial direction of the gas filter. The axial direction will usually be transverse to the flow direction F or supply direction of the fluid. In practice, the coalesced droplets usually have a droplet size or diameter of a few μm to a few mm. It is assumed that at least a part of the droplets of the disperse phase, for example contamination in the form of droplets, drains through the drainage layer and that a part drains along the surface of the coalescence medium facing the drainage medium.

In the prior art, in order to ensure efficient drainage, a drainage medium with a high affinity and/or efficient absorption capacity for the coalesced disperse phase is often used, so that drops which can not be drained along the drainage surface can be efficiently absorbed by the drainage medium. However, this high affinity entails the risk that coalesced disperse phase accumulates in the drainage medium, which in turn gives an increased risk of forming the so-called wet band, which is undesirable.

The inventors have analyzed the problems that occur in the drainage in a gas filter and have come to the understanding that an efficient drainage not only sets a combination of requirements for the drainage medium, but also that the requirements imposed on the drainage medium are opposite to the requirements that enable optimum performance of the coalescence medium. In particular, the inventors have come to the understanding that an efficient drainage medium must first and foremost be able to effect efficient drainage or removal of the coalesced disperse phase in the drainage direction. The inventors have further come to the understanding that the drainage medium must be able to efficiently absorb the coalesced droplets which have not been drained in a first part of the drainage layer in the vicinity of or adjacent to the coalescence medium, to transport them through at least part of the drainage layer and drain them there in the direction of the drain.

In addition, it is important, in the example of an oil gas filter, to minimize accumulation of undrained disperse phase, for example oil, in the drainage layer and/or the remainder of the drainage medium and to minimise and even prevent renewed transfer of coalesced oil to the gas flowing through the drainage medium, for example air. In other words, it is important that there is as little as possible tendency to accumulate and re-release or so-called re-entrainment of coalesced oil from the drainage medium or a barrier layer located downstream thereof to the purified air from the coalescence medium.

The inventors have come to realize that a filter medium that solves these problems can be obtained by using a single package composed of a coalescence medium, a drainage medium and a barrier layer, which are constructed as flat materials.

The use of flat materials in particular makes it possible to maximize the contact area between adjacent layers and ensure maximum transfer of coalesced disperse phase to the drainage medium. With flat materials it is meant according to this invention that the individual layers or sheets of material from which the coalescence medium, the drainage medium and the barrier layer are built up, are not folded, pleated or corrugated but are mounted as such in the filter medium.

The presence of a drainage medium with a drainage layer with a greater thickness in the flow direction F of the gas and an open structure provides a drainage medium with a high drainage capacity. The larger thickness provides a longer path for drainage, so that any drainage that did not take place in a first part of the drainage layer of the drainage medium can still continue in a part of the drainage medium further removed from the coalescence medium, so that the risk of building a wet band can be reduced to a minimum. This reduces the risk that coalesced disperse phase would accumulate in the drainage layer and/or drainage medium as well as in the barrier layer disposed downstream of the drainage medium, and consequently the risk of release from the barrier layer of coalesced disperse phase accumulated therein to flow-through gas leaving the filter may be reduced.

Surprisingly, it has been found that due to the presence of a single package composed of a consecutive coalescence medium, drainage medium and barrier layer in combination with a drainage medium with an open structure, the large layer thickness of the drainage medium does not adversely affect the risk of pressure build-up in the drainage layer, especially does not increases pressure build-up in the drainage layer. A larger layer thickness would be expected by the skilled person to give rise to a rise in channel pressure and capillary pressure. However, the use of a single package of a coalescence medium, a drainage medium and a barrier layer adjacently positioned in the filter element or filter medium allows for the number of material transitions to be overcome by the coalesced disperse phase to be minimized when passing through the filter element, and in that way for the capillary pressure to be limited to a minimum. The capillary pressure is the pressure that must be overcome by the coalesced phase when undergoing a transition from one material to another. The risk to pressure build-up is further reduced by the open structure of the drainage medium.

The presence of a drainage medium with a greater thickness in the flow direction F of the gas and an open structure as described above, thus makes it possible on the one hand to increase the drainage capacity and thereby minimise the risk to the formation of a wet band and re-entrainment of coalesced disperse phase by the gas that leaves the filter element. On the other hand, it is also possible to minimise the risk to pressure build-up in the filter medium as well as to minimise pressure drop across the filter, despite the greater thickness of the drainage medium.

This invention thus makes it possible to further increase the filter performance despite the greater thickness of the drainage medium, and improve the purity of the carrier present in the fluid leaving the filter as well.

By using a layered material, the material selection for each of the individual layers can moreover be optimized, taking into account the function or functions to be fulfilled by this layer.

The one or more spacers preferably extend in the flow direction F of the fluid. This does not detract from the fact that spacers can also be present which extend in one or more other directions to give structure to the drainage medium. Such spacers provide a drainage layer with high capillarity in the drainage direction. The spacers provide a drainage zone or drainage layer in a drainage medium with an open structure and a relatively higher drainage capacity in the drainage direction, in other words a high permeability for the coalesced disperse phase in the drainage direction and a relatively lower permeability for the disperse phase in the flow direction of the fluid. This makes it possible to minimize the risk to accumulation of coalesced disperse phase in the barrier layer and the formation of a wet band at the bottom of the drainage layer and/or the remainder of the drainage medium. On the other hand, the presence of the barrier layer makes it possible to stop the part of the disperse phase that might not have been drained via the drainage layer and/or the drainage medium, and to minimize the risk of re-entrainment.

The gas filter of this invention can be used for a wide range of application areas, but is particularly suitable for use with a gas which contains a liquid disperse phase, for example a disperse phase of a pollutant to be coalesced, for example an air contaminated with oil or water droplets, in particular air contaminated with an oil or water aerosol.

This invention also relates to a compressor provided with a gas filter according to the invention as described above, as an oil separator. Such an oil separator is usually placed immediately behind the outlet of the compressor, is directly coupled thereto and is intended for removing larger amounts of oil present in the compressed air leaving the compressor. Compressed air leaving a compressor usually contains oil in a concentration between 10 mg/m$^3$ air and 8000 mg/m$^3$ air.

The spacers are preferably arranged so as to provide a drainage medium of a material with pores whose diameter varies between 5.0 and 20000.0 µm, preferably between 25.0 and 10000.0 µm, more preferably between 100.0 and 2500.0 µm. The pore diameter may be measured using the bubble point method, for example as disclosed in ASTM F316 or ASTM6767 or ISO 2942. Such a material is open in the drainage direction and is capable of acting as a drainage layer and in the drainage direction D to ensure a drainage speed which is relatively greater than the drainage speed in the flow direction F of the gas through the gas filter.

To ensure efficient drainage, the average pore diameter of the pores of the drainage layer in the drainage direction is preferably greater than the average droplet size of the coalesced disperse phase.

Furthermore, the average pore diameter of the pores of the drainage medium in a direction transverse to the drainage direction is preferably smaller than the average droplet size of the coalesced disperse phase.

In order to minimize the risk of renewed transfer of droplets of the disperse phase to the fluid leaving the coalescence medium and flowing through the drainage medium, the barrier layer preferably comprises a porous material with pores whose diameter varies between 5.0 and 1000.0 µm, preferably between 25.0 and 750.0 µm, more preferably between 100.0 and 500.0 µm.

Generally, the drainage medium will preferably have a thickness that is greater than the thickness of the barrier layer to ensure as efficient drainage as possible. In particular, the drainage medium will have a thickness between 0.5 and 20.0 mm, preferably between 1.0 and 10.0 mm, more preferably between 2.0 and 6.0 mm. In order not to increase the thickness of the filter element too much, the barrier layer preferably has a thickness between 0.01 and 20.0 mm, more preferably between 0.1 and 4.0 mm, most preferably between 0.1 and 2.0 mm.

A preferred embodiment of the present invention is characterized in that the drainage medium upstream of the drainage layer contains a capturing layer of a material selected from the group of materials for capturing or collecting and discharging the coalesced disperse phase leaving the coalescence medium, to provide desired physicochemical properties, or a combination of two or more of the aforementioned material properties. The capturing layer is preferably made of or comprises a material with on the one hand a good absorption capacity for the coalesced disperse phase, which absorption capacity is higher than that of the drainage layer, and a permeability in the direction of flow F for the coalesced disperse phase which is greater than that of the drainage medium. Thereby, the capturing layer is arranged at a surface of the drainage medium facing the coalescence medium.

Preferably, a porous material of which the pores have a diameter in the range from 5 to 20000.0 µm, preferably from 25.0 to 10000.0 µm, more preferably from 100.0 to 2500.0 µm, is used as capturing layer. In general, the capturing layer will have a thickness between 0.1 and 20.0 mm, preferably between 0.1 and 4.0 mm, more preferably between 0.1 and 2.0 mm, although thinner or thicker material layers can also be used.

The presence of the capturing layer ensures on the one hand an efficient capture of the coalesced drops leaving the coalescence medium and on the other hand an efficient transfer or flow or conduction of these drops to the drainage layer of the drainage medium. The capturing layer functions as it were, as a transfer layer for coalesced disperse phase originating from the coalescence medium to the drainage layer of the drainage medium, but it can also function as a drip layer for the removal of droplets of the disperse phase, for example drip contamination, and for the optimization of the contact between the coalescence medium and the drainage layer.

In order to allow for an efficient capture of coalesced droplets of the disperse phase and other droplets of the disperse phase from the coalescing medium to the drainage medium, a surface of the drainage medium facing the coalescence medium preferably comprises a plurality of protrusions directed towards the coalescence medium, preferably in a manner in which the projections make contact with the coalescence medium. Examples of such protrusions include loops, fibers, stitches, tufts, rings or the like. To this end, the drainage layer is preferably manufactured from a material selected from a knitted fabric, a crocheted material, a fabric of tufted fibers or a fabric, wherein a looped surface of the drainage layer is directed towards and preferably in contact with a surface of the coalescence medium along which coalesced disperse phase leaves the coalescence medium. In an alternative preferred embodiment, a capturing layer is provided thereto, made of a material selected from a knitted fabric, a crocheted material, tufted fibers or a fabric, wherein a looped surface of the capturing layer is oriented towards and preferably in contact with a surface of the coalescence medium, and an opposite surface is directed or connected to the remainder of the drainage medium. Examples of such materials include, for instance, materials from the group of a spacer textile, a spacer fabric, a spacer knitting, a polymer foam, in particular a polyurethane foam, or a combination of two or more of the aforementioned materials. However, other materials known to the skilled person which show these properties can also be used.

A preferred embodiment of the present invention is characterized in that the drainage medium contains spacer fibers which extend between opposite skins of the spacer material, in particular the spacer textile and/or spacer fabric and/or spacer knitting, wherein the spacer fibers are made of a monofilament or multifilament material.

A further preferred embodiment is characterized in that a first skin of the drainage medium, in particular a first skin of these spacer materials facing the coalescence medium has an open structure and serves as a conductor or guiding for the coalesced disperse phase, preferably as a capturing layer, and ensures optimum contact with the coalescence medium. A second skin positioned on the opposite side of the drainage medium, in particular the spacer material, serves as a barrier layer and has a low permeability to the coalesced disperse phase. In a further preferred embodiment, the first skin has a plurality of loops and/or stitches and/or fibers extending in the direction of the coalescence medium.

The use as drainage medium of a three-dimensional spacer material as described above or a polymeric foam comprising a drainage medium with a drainage layer and a capturing layer, makes it possible to accommodate the barrier layer and the drainage medium in one single material, in which the layers are interconnected and are already connected during the material production process. This benefits the stability of the drainage medium and limits the risk that one or more of the individual layers would shift with respect to each other during use of the gas filter, for example caused by the pressure prevailing in the filter. The spacer fibers extending in the flow direction of the fluid also impart mechanical strength or firmness to the drainage medium and the gas filter in general. With an adequate choice of material, a gas filter may be obtained which has such a mechanical strength and stiffness that the usual supporting metal structure can be omitted.

This invention also relates to a filter element as described above.

This invention further relates to a method for separating a disperse phase present in a fluid from the fluid using a gas filter as described above. Gas filters, or so-called in-line filters typically used for purifying air from an oil aerosol or water aerosol contained therein, are usually intended for application to air streams containing oil as a disperse phase at a concentration ranging between 50.0 mg oil/m3 air and 0.1 mg oil/m3 air.

BRIEF DESCRIPTION OF THE DRAWINGS

The invention is further elucidated on the basis of the attached figures and detailed description of the invention and the figures.

FIG. 2a shows a preferred embodiment of a drainage medium of this invention, which comprises a drainage layer and a barrier layer. FIG. 2b shows another preferred embodiment of a drainage medium of this invention, which comprises a capturing layer, a drainage layer and a barrier layer. FIGS. 2c and 2d show an embodiment of the drainage medium, with a different arrangement of the drainage layer, barrier layer and capturing layer. FIG. 2e shows a detail of the drainage medium.

DETAILED DESCRIPTION OF THE INVENTION

Figure 1:
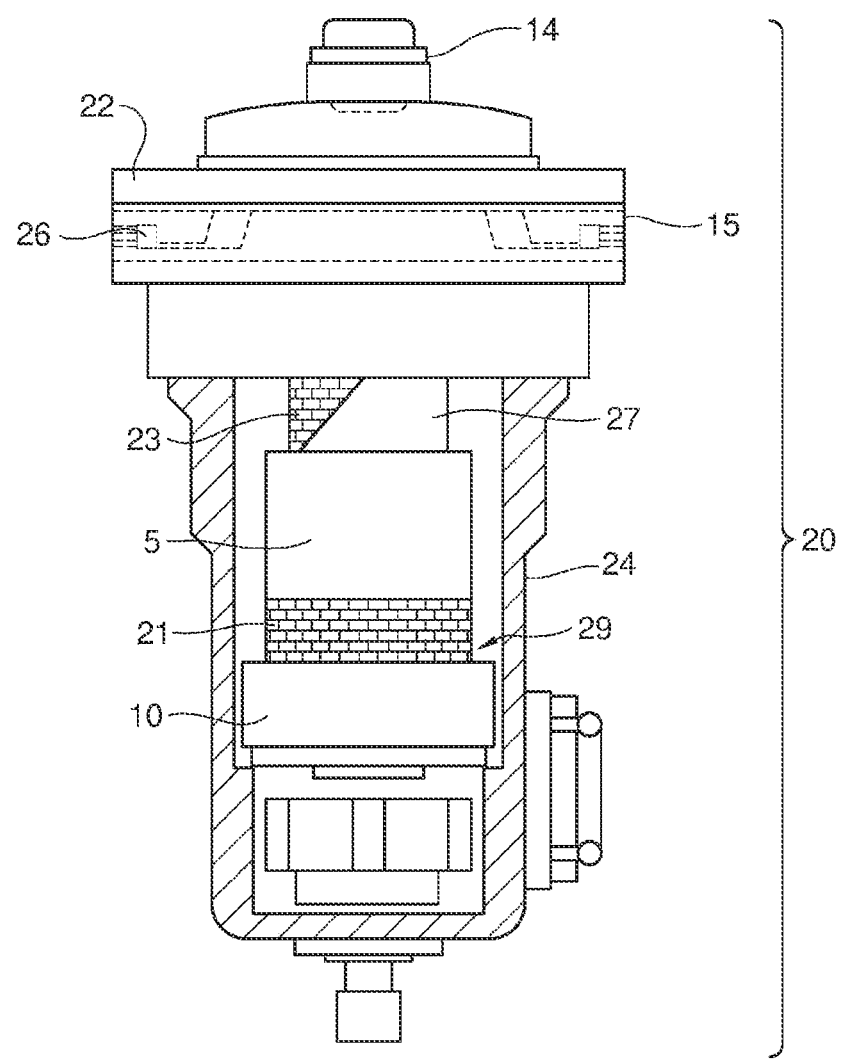
FIG. 1 shows a view to the inside of a representative gas filter for the separation of oil droplets present in compressed gas.

The gas filter 20 shown in FIG. 1 comprises a closed housing 24 with a filter head 22 at the top. Filter head 22 contains an inlet 26 along which a fluid containing a carrier and at least one disperse phase, for example an aerosol of an impurity present in the carrier, enters the filter element 29 contained in the gas filter 20. The housing 24 comprises an outlet 15 for discharging a fluid and/or carrier liquid which has passed through the filter element. Filter head 22 is releasably connected to housing 24 to allow access to the interior of the gas filter if necessary. The releasable connection can be effected in any manner deemed appropriate by a person skilled in the art, for example by means of a screw connection, by means of pressure, friction, clamping, etc. A fluid can be fed via inlet 26 to the interior of the gas filter 20, and flow from the interior through or across the filter element towards and through the drainage medium 10. The filter element 29 is preferably substantially cylindrical and detachably connected to the filter head 22, so that the filter element 29 can be periodically replaced, or can be replaced if necessary.

Preferably, the filter element also includes a core 23 for providing structural integrity thereto. However, if so desired, the presence of the core 23 can be dispensed with, particularly if a drainage medium 10 according to the present invention is used which is capable of offering a great structural integrity. The housing 24 may further include a drainage mechanism to effect discharge of coalesced disperse phase. A suitable drainage mechanism may comprise automatic, semi-automatic or manually operated valves, along which a coalesced and drained disperse phase retained in the housing 24 is removed.

The gas filter 20 may further contain optional components which further improve the use and the filter performance. For example, filter head 22 may include a status indicator 14, which gives an indication of the status of the gas filter 20, including the potential need for a periodic replacement. The indicator 14 can operate pneumatically or electrically or according to any principle deemed suitable by the person skilled in the art.

The gas filter shown in FIG. 1 is intended for coalescing one or more disperse phases present in a gaseous carrier of a fluid, for example one or more impurities present in a gas or a mixture of two or more gases. The one or more impurities may for example belong to the group of liquids, aerosols, macro-drops or mixtures of two or more of these materials. An example of a fluid suitable for use with the gas filter 20 of this invention is air, for example compressed air, contaminated with an oil aerosol. Another example suitable for use with the gas filter 20 of this invention is air or compressed air contaminated with a water aerosol. In the following description, reference will always be made to the non-limiting example of compressed air contaminated with an oil aerosol.

The gas filter shown in FIG. 1 contains one or more supporting structures or supports 21, to support the coalescence medium 5 and drainage medium 10, to provide sufficient mechanical and structural firmness to the filter material and to minimize the risk of mechanical deformation of the coalescence medium 5 and the drainage medium 10 under the influence of load by minimizing the fluid, and protecting the afore-mentioned materials from the effects of unexpected or sudden impact or pressure changes.

The filter element 29 of the present invention is composed of a single package of the coalescence medium 5, the drainage medium 10 and a barrier layer 2. By a single package is meant that the filter element 29 in the flow direction of the gas is considered to contain one package consisting of a coalescence medium 5, a drainage medium 10 and a barrier layer 2 in the indicated sequence. The filter element 29 contains only one such package.

The coalescence medium 5, drainage medium 10 and barrier layer 2 are arranged adjacent to each other, in order to minimize the number of material transitions to be overcome by the coalesced disperse phase when passing through the filter element 29 and to minimize the capillary pressure thereby produced. The capillary pressure is the pressure that must be overcome by the coalesced phase when moving from one material to another.

In the filter element 29 of the present invention, both the coalescence medium 5 and the drainage medium 10 and the barrier layer 2 are formed as flat layer-shaped materials. By a sheet-shaped layer-shaped material is meant a material which is in the form of a fabric, a cloth, a mat or similar having a certain thickness in the direction of flow of the fluid. The design as a flat sheet-shaped or layer-shaped material refers to the fact that said media are substantially flat, that is to say they are not pleated, folded or corrugated or arranged three-dimensionally in one way or another. This flat layer shaping makes it possible to maximize the contact area between adjacent layers and ensure maximum transfer of coalesced disperse phase from the coalescence medium 5 to the drainage medium 10.

The filter element 29 contains a primary coalescence medium 5 for coalescing one or more disperse phases present in the fluid. The filter element 29 further comprises a drainage medium 10 for draining the coalesced disperse phase which has left the coalescence medium 5. The drainage medium 10 is arranged downstream of the coalescence medium 5, taken in the flow direction of the fluid. For example, the coalescence medium 5 and the drainage medium 10 can be arranged concentrically in the filter housing 24. Depending on the intended application, especially if coalescence of several disperse phases is envisaged, the primary coalescence medium 5 may be composed of two or more layers of the same or different materials each with a desired affinity for the disperse phase to be removed. These two or more different layers are preferably arranged concentrically. The coalescence medium 5 is provided to induce and promote aggregation or coalescence of the disperse phase from the fluid. A fluid, for example air contaminated with oil as a disperse phase, is fed to the interior of the gas filter 20 via the inlet 26 and flows further to the filter material, where the air is first taken up by the primary coalescence medium 5. While the air flows through the coalescence medium 5, the disperse oil phase often coalesces in the first layers of the coalescence medium 5, and with continuous supply of oil-contaminated air the smaller droplets grow into larger droplets in the coalescence medium 5. As soon as the coalesced droplets reach a size where they no longer adhere to the fibers of the coalescence medium 5, they are entrained with the air flowing through the coalescence medium 5 to the surface of the coalescence medium 5 facing the drainage medium 10 and/or the drainage layer, along which a first drainage preferably under the influence of gravitation can take place. Part of the coalesced oil can end up in the drainage medium 10 and be drained from the filter material through drainage via the drainage medium 10. Coalesced drops typically have a droplet diameter of 5 to 1000 μm.

In the example shown in FIG. 1, the gas filter 20 contains a porous drainage medium 10 downstream of and in the flow direction of the fluid, adjacent to the coalescence medium 5. According to the invention, however, it is possible that the drainage medium 10 is a layered material that contains two or more adjacently arranged material layers 1. Hereby, the adjacent material layers can be formed of the same or a different material. With drainage layer is further meant a layer of the drainage medium directed towards a capturing layer 3 of the coalescence medium 5, with a surface directed towards the coalescence medium along which drainage mainly takes place.

The drainage medium 10 can be arranged at a distance from the coalescing medium 5, with an air layer or other physical separation between both media. Preferably, however, the drainage medium 10 is arranged adjacent to an outgoing surface of the coalescence medium 5 along which coalesced disperse phase leaves the coalescence medium 5, without air layer or other physical separation between both media because this promotes an efficient transfer of droplets from the coalescence medium 5 to the drainage medium 10. More preferably, the coalescence medium 5 and the drainage medium 10 are arranged concentrically. This benefits an energy-efficient flow of fluid, in particular an efficient flow of the carrier and an efficient transfer of the disperse phase from the coalescence medium 5 to the drainage medium 10, and makes it possible to achieve a transfer of coalesced disperse phase from the coalescence medium 5 to the drainage medium 10 which is as complete as possible. A drainage medium 10 disposed downstream of the coalescence medium 5 is intended to maximize the influence of gravity on the coalesced disperse phase in drainage direction D, perpendicular to flow direction F of the fluid.

Without wishing to be bound thereto, it is assumed that the surface of the drainage medium 10 facing the coalescence medium 5 provides a boundary or transition zone for the adjacent surface of the coalescence medium 5, which allows for easy dripping of the coalesced droplets in drainage direction D. The drainage direction D is usually arranged at an angle with respect to the flow direction F of the fluid. Preferably the drainage direction runs transversely to the flow direction of the fluid F. Preferably, the drainage direction D extends in the direction of gravity. Usually this will correspond to the axial direction of the gas filter 20, but it can also deviate from it. However, the inventors have found that in the prior art gas filter 20, part of the coalesced disperse phase can not be discharged along the drainage surface of the drainage medium 10 facing the coalescence medium 5, so that a so-called wet band is formed at the bottom of the gas filter 20, of coalesced disperse phase which remains behind in the drainage medium 10. By using a drainage medium 10 according to this invention, it is now possible to minimize the formation of a so-called wet band, this is accumulation of the disperse phase, for example contamination, in a lower part of the drainage medium 10.

After having been in use for some time, the gas filter 20 usually reaches a stationary state where the accumulation rate of droplets of the disperse phase in the coalescence medium 5 corresponds to the drainage rate via the drainage medium 10. If desired, a protective layer 27 can be provided upstream of the primary coalescence medium 5. Such a protective layer 27 can also be provided downstream of the coalescence medium 5, and in that case fulfill the function of capturing layer 3. This protective layer 27 can also serve as a drainage layer 1 to control the flow of the fluid in a desired direction. An example of a suitable material for use as protective layer 27 is an open non-woven polypropylene layer, but other materials can also be used.

Definitions

With "transverse direction" D is meant within the scope of this invention any direction that extends transversely to a reference direction, this can be perpendicular to a reference direction or at any other angle. With "transverse" direction can also be meant a radial direction of the gas filter 20 or the drainage medium 10.

With "in the direction of" is meant within the scope of this invention any direction which is substantially parallel to a reference direction, or which extends at an angle with respect to a reference direction.

With "drainage medium" is meant in the context of this invention a layered material which is built up of at least one layer, in particular a medium which comprises at least a drainage layer 1 as described below. However, the drainage medium 10 may contain a plurality of adjacent drainage layers 10 which may be constructed from the same or different material to ensure optimum drainage. The drainage medium 10 further comprises a barrier layer 2 and preferably also a capturing layer 3. The drainage medium is preferably positioned adjacent to barrier layer 2. These layers are preferably positioned adjacent to each other and preferably extend in the same direction, more preferably the adjacent layers 1, 2, 3 extend parallel to each other. The layers 1, 2, 3 may have the same or different thickness in the flow direction of the fluid, depending on the intended properties of the drainage medium 10, the nature and composition of the liquid to be discharged in case several impurities are coalesced from the fluid.

In FIG. 2e, the flow direction of the fluid is indicated by an arrow "F". In FIG. 2 the flow direction of the fluid extends radially, or in other words transversely with respect to the surface of the drainage medium 10 facing the coalescing medium 5.

In FIG. 2e the drainage direction of the fluid is indicated by an arrow "D". In FIG. 2 the drainage direction of the substance to be removed extends axially, or in other words in the direction of the surface of the drainage medium 10 facing the coalescence medium 5.

The drainage medium 10 according to the invention shown in FIG. 2e contains, viewing in the flow direction of the fluid F, at least one drainage layer 1. The drainage layer 1 is preferably located on a surface 31 of the drainage medium 10 directed towards the coalescence medium 5. The drainage medium 10 is further positioned adjacent to at least one barrier layer 2 disposed downstream of the drainage layer 1. The drainage medium 10 can preferably also comprise at least one third layer 3, the capturing layer, arranged upstream of the drainage layer 1 in drainage medium 10. According to the invention, a single capturing layer 3 can be present upstream of the drainage layer 1, but it is also possible to provide an additional capturing layer 3 downstream of the barrier layer 2. In stead of barrier layer 2, also the wording barrier medium 2 may be used.

In another preferred embodiment the drainage medium 10 is a sheet-shaped material, with a porous core or layer 11 as drainage layer 1, which at the downstream side contains a skin 13 which performs the function of barrier layer 2. Upstream of the porous core or layer 11 a second skin 12 may be present at the drainage surface facing the coalescence medium 5, which fulfills the function of capturing layer 3.

A material with the properties as described above can be obtained with a drainage medium 10 which contains or is an anisotropic material. By anisotropic it is meant that the material in the drainage direction D has a higher permeability for the coalesced disperse phase than in the flow direction of the fluid F. The gravity, parallel to the drainage direction D, usually has a much greater attraction to the coalesced disperse phase than the flow direction of the fluid F, whereby the coalesced droplets drain in the direction of gravity.

The drainage layer 1 can be constructed from a sheet of one material layer. The drainage medium 10 may be made of one single material layer, the drainage medium may however also contain two or more material layers which are the same or different. The barrier layer 2 may be composed of one material layer, but the barrier layer 2 may also comprise two or more identical or different material layers. The capturing layer 3 may be composed of a sheet of one material layer, but the capturing layer 3 may also comprise two or more identical or different material layers.

The drainage medium 10, barrier layer 2 and capturing layer 3 can be designed as three separate material layers which are arranged in the filter element 29 in an adjacent positioning. In a variant, the drainage medium 10 and barrier layer 2 are connected to each other along their contact surface, and the capturing layer 3 is not connected to the drainage medium 10. In another variant, the drainage medium 10 and the capturing layer 3 are connected to each other along their contact surface and the barrier layer 2 is not connected to the drainage medium 10. In yet another variant, the drainage medium 10, barrier layer 2 and the capturing layer 3 are connected to each other along their respective contact surfaces. The individual layers can be connected to each other along their entire contact surface or along a part of it. However, the drainage medium 10, barrier layer 2 and capturing layer 3 can also be manufactured in one part and be part of one structure.

The drainage medium 10, barrier layer 2 can be made of the same or a different material, or comprise the same material. The capturing layer 3 can be made of the same or a different material as the drainage layer 1 and/or the barrier layer 2. The different layers can, in order to effect their connection with each other, be made of the same basic material, to which various materials have been further added.

A multilayer drainage medium 10 can be obtained in various ways, for instance by stacking, rolling up or concentrically wrapping a plurality of material layers, so that a drainage medium 10 with the desired thickness and drainage capacity is obtained. However, any other method for manufacturing a drainage medium 10 can be suitably used. Preferably, however, the sheet shaped material for the drainage medium 10 is wound concentrically several times in order to minimize the risk of being damaged. Adjacent material layers are preferably positioned adjacent to each other in such a way that the facing material surfaces are in contact with each other, with a possible air layer between adjacent layers having as small a thickness as possible or even being substantially or completely absent.

In another embodiment, the drainage medium 10, as shown in FIG. 2e, is a layered sheet material, with a porous layer or core 11, which contains upstream in the flow direction of the fluid F a first skin 12. The first skin 12 preferably provides the drainage surface along which the coalesced disperse phase from the coalescence medium 5 is discharged, and can further serve as a capturing layer 3. The porous layer 11 fulfills the role of drainage layer 1. The second skin 13 located downstream, fulfills the function of barrier layer 2.

When analysing the functioning of the drainage medium 10, the inventors have found that the drainage medium 10 performs several functions in the gas filter 20. In addition to providing a drainage function for the removal of droplets of coalesced disperse phase from the coalescence medium 5, the drainage medium 10 also serves as a barrier to prevent so-called "oil carry over", especially if a so-called "wet band" of coalesced disperse phase. e.g. contamination, is build up and remains at the bottom of the drainage medium 10 in the direction of the drain. This "wet band" entails the risk that purified fluid leaving the gas filter 20, for example, partly takes up this disperse phase, for example one or more impurities, when leaving the drainage medium 10 via the "wet band". This is also called oil transfer or oil carry-over. The presence of a "wet band" can also cause unwanted pressure build-up in the filter 20.

With "drainage medium" 10 is meant according to the present invention a layer 1 of a material for draining or removing the droplets of one or more disperse phases and coalesced droplets of one or more disperse phases from the coalescence medium 5, via the drainage mechanism present in the gas filter 20, in a drainage direction D. In FIG. 2a the drainage direction is indicated by the arrow "D". With drainage medium 10 is also meant within the scope of this invention a connection between the coalescence medium 5 and the barrier layer 2 by one or more spacers.

The drainage medium 10 may contain one or more drainage layers 10, and may, if desired, be a layered porous material. Successive material layers may or may not be connected to each other and may or may not be arranged in an adjacent positioning, but are preferably arranged adjacently. Furthermore, successive layers are preferably tightly stacked, so that the distance between successive layers is minimal and that a possible air layer between consecutive layers has a minimum thickness or is preferably even absent.

By tightly stacked is meant that successive layers are in contact with each other, or in other words that successive layers are arranged adjacent. This also makes it possible to minimize the risk of liquefaction or flowing of the fluid between successive layers and ensures that fluidum transport mainly occurs in the flow direction F. The drainage medium 10 preferably comprises at least 1 layer of a porous drainage material, preferably at least two layers. The number of layers will usually not exceed 5 as the drainage efficiency is not significantly improved by adding multiple layers and the material cost threatens to become disproportionately high. In a drainage medium 10 which itself is also a layered material, the individual layers or sheets preferably run parallel to each other, and more preferably likewise parallel to the coalescence medium 5.

Drainage medium 10 can have a thickness that may vary within wide limits. Preferably, however, the drainage medium 10 has a thickness between 0.5 and 20.0 mm, more preferably between 1.0 and 10.0 mm, most preferably between 2.0 and 6.0 mm. If the drainage medium 10 itself is a layered material, the layer thickness of the individual drainage layers 1 can vary, for example from 0.1 to 1.0 mm, preferably from 0.1 to 0.4 mm, more preferably from 0.1 to 0.5 mm, most preferably from 0.1 to 0.6 mm. The person skilled in the art is able to select the desired layer thickness, taking into account the intended total layer thickness.

The drainage medium 10 and drainage layer 1 preferably have a porous, open structure in the drainage direction, which enables efficient drainage or removal of the coalesced disperse phase from the gas filter 20. The drainage direction will usually extend substantially in the axial direction. To this end, the drainage medium 10 is preferably formed as a material with a higher affinity in the drainage direction relative to the flow direction of the fluid. In the radial direction, or the direction transverse to the drainage direction, or in other words in the flow direction of the fluid, the affinity and permeability of the drainage layer 1 for the coalesced disperse phase will preferably be considerably lower.

Various materials can be used as drainage medium 10, provided that they effectuate an efficient drainage of the coalesced droplets in the drainage direction D.

The material for the drainage medium 10 may be wetting for one or more of the coalesced disperse phases, or non-wetting. The material for the drainage medium 10 can for example be oleophobic or hydrophobic, or oleophilic or hydrophilic. In applications where the removal of oil from a liquid or gas stream is intended, the drainage medium 10 may be oleophilic or oleophobic. The material for the drainage medium 10 is preferably chosen such that it exhibits a low affinity for the impurity to be removed, so as to promote the drainage in the gravitational direction.

Figure 3A:
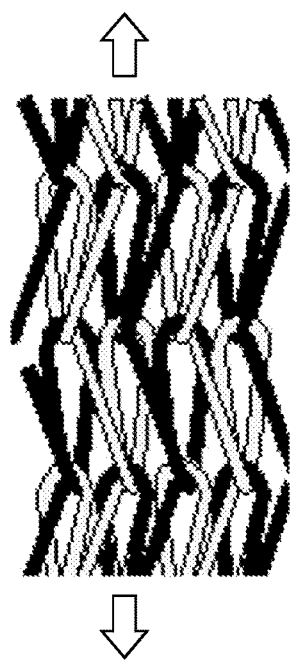
FIG. 3a-f show a view of a three-dimensional knit.
Figure 3B:
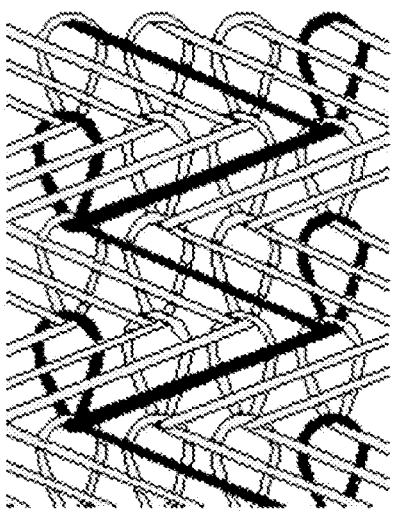
Figure 3C:
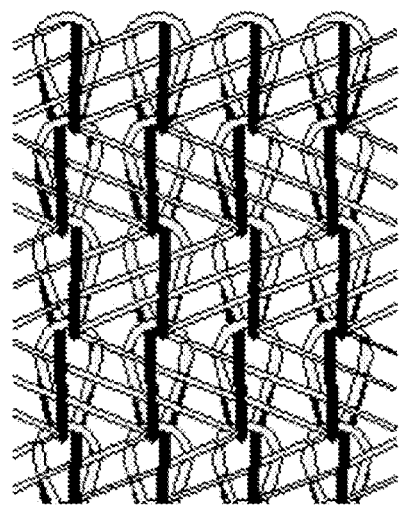
Figure 3D:
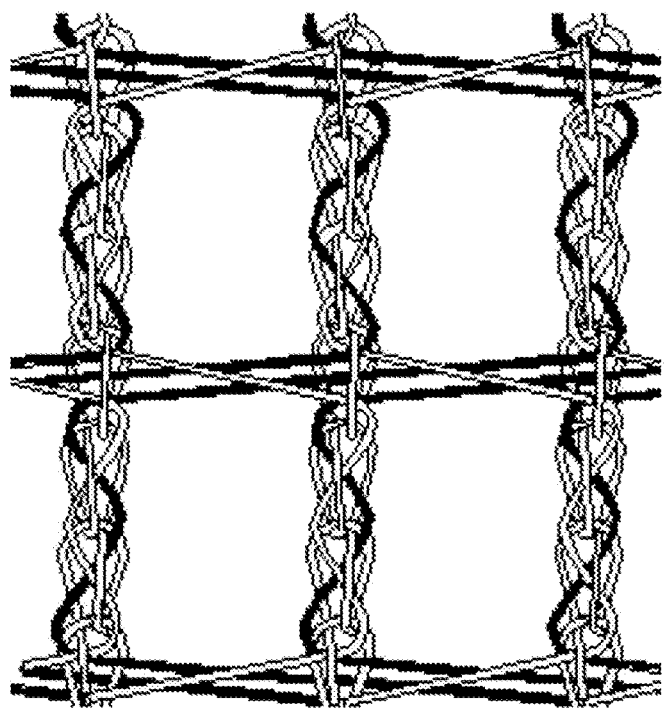
Figure 3E:
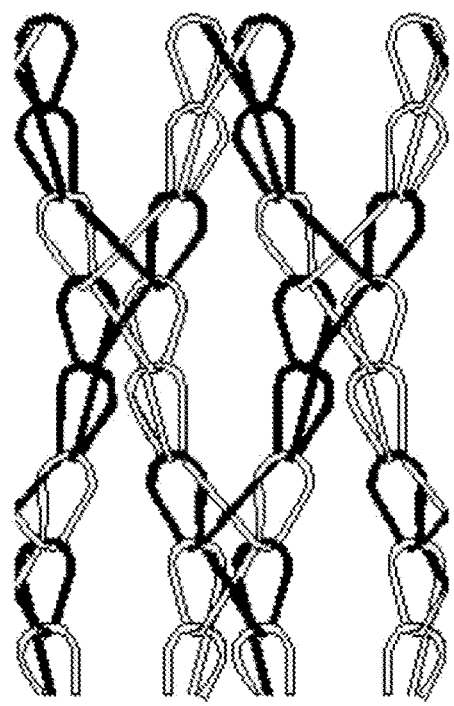

In a first preferred embodiment, the drainage medium 10 comprises a plurality of connectors which connect a skin of the drainage medium 10 lying adjacent to the coalescent medium 5 to a skin of the drainage medium 10 directed towards the barrier layer 2. These connectors can have any shape considered by the person skilled in the art, and may be part of drainage medium 10. For example, the connectors may take the form of fibers, monofilament or multifilament fibers extending in the flow direction of the fluid to ensure optimum flow of coalesced disperse phase, as shown in FIG. 3a. However, the connectors can also extend in any other direction, as shown in FIG. 3b.

In a second preferred embodiment, drainage medium 10 comprises a polymer foam or drainage medium 10 is built up from a polymer foam which has an open structure or open cells in the axial direction of the gas filter 20. Various types of polymer foams can be used, for example foams of polyurethane, polyethylene, polypropylene, polyvinyl chloride, polystyrene, polycarbonate, polyimide. Preferably, however, a polyurethane foam is used, a wide variety of polyurethane foams with various pore structures are commercially available or can be produced. In another preferred embodiment use is made of a foam of which one side is subjected to a thermal treatment, for instance for forming the barrier layer 2 integrally in one part with the drainage medium 10.

In another preferred embodiment, drainage medium 10 comprises a three-dimensional spacer textile, a three-dimensional knit, or a combination of two or more of these materials, wherein opposed skin layers of the spacer textile or three-dimensional knit are connected by means of spacer fibers 50 of which at least a part extends in the flow direction of the fluid (F) through the gas filter 20. Spacer fabrics or textiles are known per se.

In a third preferred embodiment, drainage medium 10 is built up from a spacer textile of a woven or non-woven fibrous material, as described below.

In a fourth preferred embodiment, drainage medium 10 is built up from a spacer knitting made of a fibrous material, preferably continuous fibers, as described below.

Various methods are known to the person skilled in the art for manufacturing a spacer knitting. A frequently used method comprises the following steps:

The manufacture of a knit by knitting a first knitted layer provided with openings of a first thread system, a second knitted layer provided with openings of a second thread system and intermediate threads connecting the first knitting layer and the second knitting layer so that a three-dimensional knit arises;

The omission of individual distance threads during knitting to form channels running in a production direction or spacer threads that knot at a certain distance from each other in one of the two knitted layers to form crossways;

Providing heat for melting at least a part of the running surfaces of the second system;

Melting of some threads of the second thread system,

Reinforcement of the second knitted layer by cooling and separating the drainage layer 1 from the knitted fabric web.

Figure 5A:
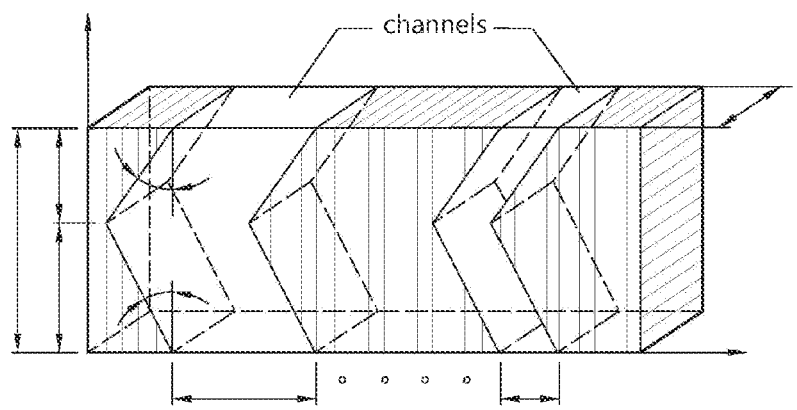
FIG. 5a-c show a cross-section of an example of a drainage layer, with indication of possible forms of channels present in the drainage layer.
Figure 5B:
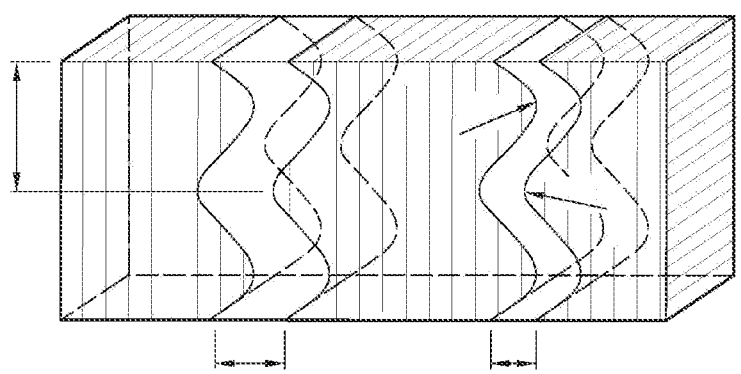
Figure 5C:
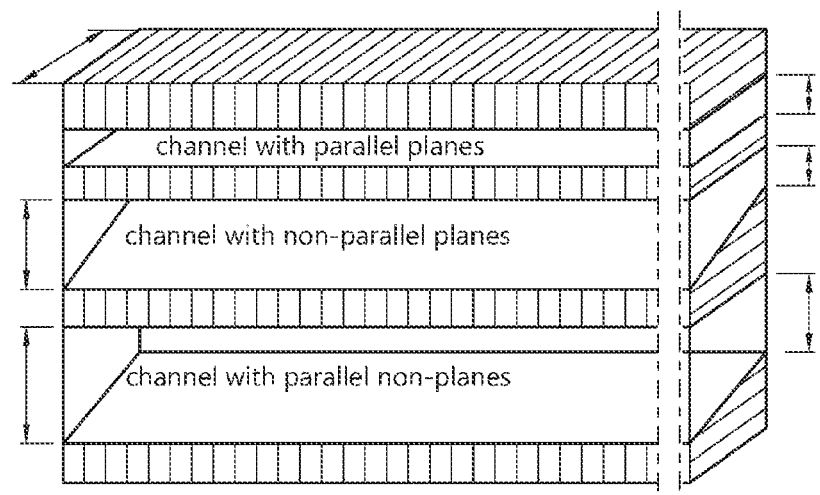
Figure 6A:
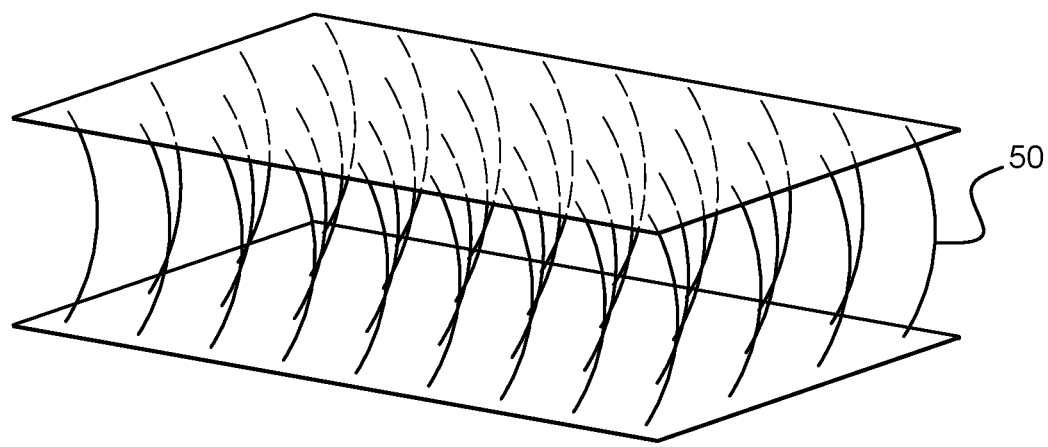
FIGS. 6a and b show a view of a preferred embodiment of a spacer fabric.
Figure 6B:
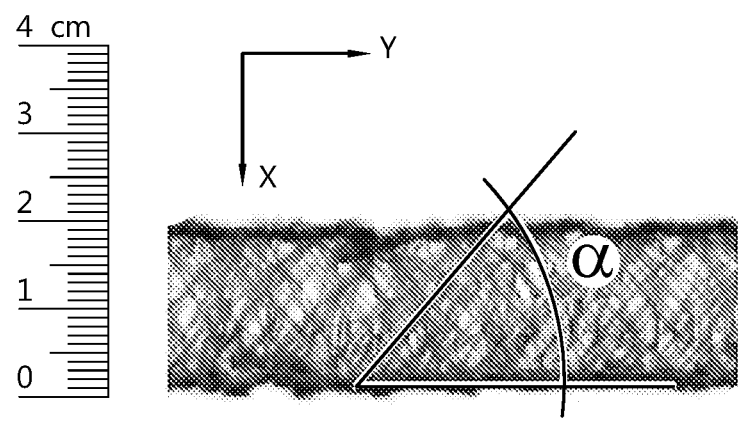
Figure 7:
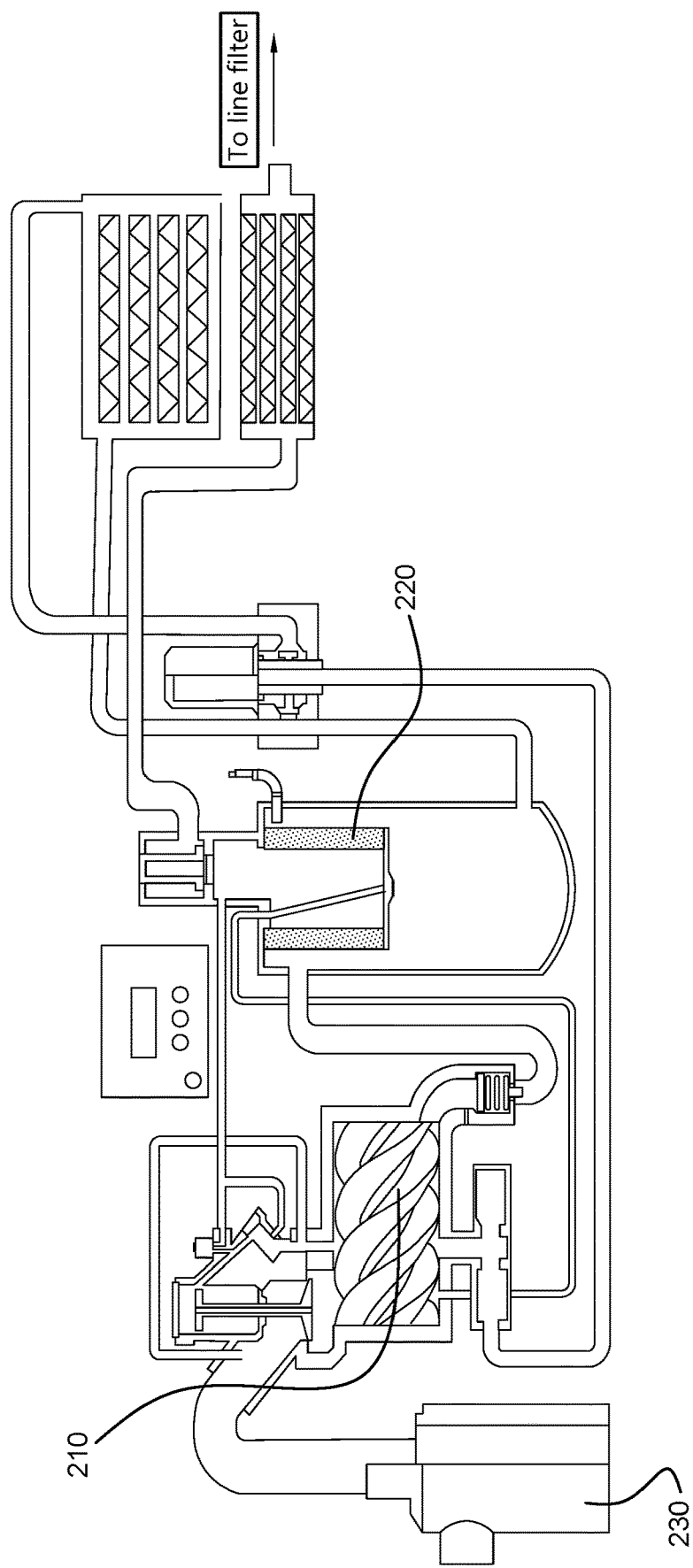
FIG. 7 shows a compressor with an oil separator directly coupled to the compressor.

The inner structure of a spacer textile can itself be composed of one or more layers. Adjacent layers may be separated from each other by a sheet or tissue, and adjacent layers may have the same or a different thickness. As shown in FIG. 5a-c, the inner structure of a spacer textile, fabric or knit may contain various types of channels. Preferably, the inner structure includes at least one, but preferably a plurality of channels that extend in the drainage direction. These channels may be substantially straight, but they may also be curvy or have a specific shape that promotes drainage. Furthermore, one or more channels may be present which extend in the flow direction of the fluid. These channels preferably have a sufficiently small diameter, so that an efficient barrier function is provided in the flow direction of the fluid. Furthermore, one or more channels may be present which extend parallel to the skin. These channels can contribute to an efficient transport of droplets through the inner structure of the drainage medium 10 and enable efficient drainage.

By "barrier layer" 2 is meant within the scope of this invention a sheet or layer of a material having a lower permeability to the coalesced disperse phase than the drainage medium 10. With barrier layer 2 is meant in particular a material capable of absorbing or absorbing and draining in the drainage direction D coalesced disperse phase which would not have been discharged via the drainage medium 10. The material of the barrier layer 2 will usually have some affinity for the coalesced disperse phase. The barrier layer 2 can be made up of one sheet of a material, but can itself also be a layered material, which is composed of two or more layers. In order to obtain a desired layer thickness, the sheet material for the barrier layer 2 can be wound concentrically several times. Successive material layers are preferably arranged adjacent to each other, with a possible air layer between adjoining layers having as small a thickness as possible or even being substantially or completely absent.

A barrier layer 2 arranged downstream aims to counteract as much as possible and preferably prevent carry over or carry along by the purified fluid flowing across the drainage medium 10, of coalesced disperse phase which has not been drained along the drainage surface or the drainage medium 10. The barrier layer 2 aims to provide a purified fluid with as low a concentration of disperse phase, for example one or more impurities, that is as small as possible. The permeability of barrier layer 2 for the coalesced disperse phase will usually be considerably lower than that of drainage medium 10.

Barrier layer 2 therefore usually comprises or is usually composed of a material with a low permeability for the coalesced disperse phase. Barrier layer 2 preferably comprises a material with pores the diameter of which varies between 5.0 and 1000.0 µm, preferably between 25.0 and 750.0 µm, more preferably between 100.0 and 500.0 µm.

The barrier layer 2 may be made of various materials, for example from a sheet of woven or non-woven fibers, barrier layer 2 may be a knit especially a 2-dimensional knit or an equivalent material, a sheet material made of tufted fibers, stitched fibers, fibers spun into a web, a net, or materials formed into a film, a foam with open cells in the drainage direction, molded fibers and combinations or laminates or composites of the aforementioned materials.

Materials for use in the barrier layer 2 may be selected, for example, from the group of thermoplastic or thermosetting plastics, for example, polypropylene, polyethylene, polyester, or inorganic substances, metallic materials or alloys, mixtures of the aforementioned materials and chemically modified forms thereof. Usually these materials will be used in the form of fibers or a foam. Polyurethane foams are particularly preferred since they are well resistant to thermal stress by the fluid and/or the carrier and contaminating liquid present in the fluid.

FIG. 3a-3e shows various knitted fabrics that are particularly suitable for use as a barrier layer 2 in this invention. Such knits are available as 2-dimensional knit. However, other materials, for example a net, a sheet, a braided material, a knit, a crocheted material, a woven or non-woven material or a combination of two or more of such materials, a surface of these materials intended for contact with the drainage medium 10 is provided with tufts, stitches, loops, rings, upright fibers or equivalent means, are suitable for use in this invention.

Barrier layer 2 can have a thickness that varies within wide limits. Preferably, however, barrier layer 2 has a smaller thickness than drainage medium 10. More preferably, barrier layer 2 has a thickness between 0.01 and 20.0 mm, more preferably between 0.1 and 4.0 mm, most preferably between 0.1 and 2.0 mm.

In a preferred embodiment, the drainage medium 10 comprises a third layer or capturing layer 3, which is arranged upstream of the drainage layer 1. By capturing layer 3 is meant within the scope of this invention a layer or a sheet of a material capable of ensuring efficient capture or absorption of the coalesced disperse phase leaving the coalescence medium 5. The material for the capturing layer 3 will preferably be selected such that the capturing layer 3 has a high permeability for the coalesced disperse phase in the flow direction of the fluid 1, so that an efficient transfer of the coalesced disperse phase from the coalescence medium 5 to the drainage layer 1 of the drainage medium 10 may be ensured. The material of the capturing layer 3 will usually have some affinity for the coalesced disperse phase to allow for efficient capturing of the coalesced disperse phase leaving the coalescence medium 5.

The capturing layer 3 can be made up of one layer of a material, but can itself also be a layered material, which is built up of two or more layers in order to obtain a desired layer thickness. Successive material layers are preferably arranged adjacent to each other, with a possible air layer between adjoining layers having as small a thickness as possible or even being substantially or completely absent.

Figure 4:
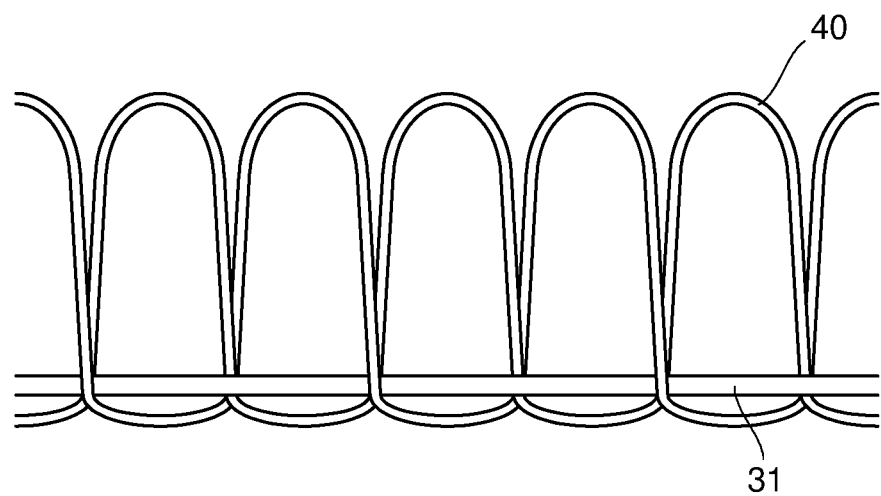
FIG. 4 shows a view to a surface of the drainage layer.

A surface of the capturing layer 3 facing the coalescence medium 5 preferably comprises a plurality of projections 40, preferably loops or fibers or rings or equivalent means, which extend towards and preferably up the coalescence medium 5, preferably in a manner in which the protrusions contact the coalescence medium 5 to allow for an efficient transfer of coalesced droplets which have left the coalescence medium 5. This is for example shown in FIG. 4. Capturing layer 3 usually comprises a material with good dripping properties for the coalesced disperse phase in the drainage direction. Capturing layer 3 can have a thickness that varies within wide limits. Preferably however, the capturing layer 3 has a smaller thickness than the drainage layer 1. More preferably, capturing layer 3 has a thickness between 0.1 and 20.0 mm, more preferably between 0.1 and 4.0 mm, most preferably between 0.1 and 2.0 mm. In a preferred embodiment, capturing layer 3 is manufactured from a fibrous material, for example from a sheet of fibers which are woven or non-woven, it can be a knit or an equivalent material, a material of fibers that are tufted, stitched, spun into a web, a net, or materials formed into a film, a foam with open cells in the drainage direction, molded fibers and combinations or laminates or composites of the aforementioned materials. Preferably, the fibers of the capturing layer 3 are oriented in the drainage direction D.

Materials for use in the capturing layer 3 can be selected, for example, from the group of thermoplastic or thermosetting plastics, for example, polypropylene, polyethylene, polyester, or inorganic materials, metallic materials or alloys, mixtures of the aforementioned materials and chemically modified forms thereof. Usually these materials will be used in the form of fibers or a foam.

In a preferred embodiment, the drainage medium 10 is integrally formed with the barrier layer 2 or the barrier medium 2. In a further preferred embodiment, the drainage medium 10 is integrally formed with the barrier layer 2 and with the capturing layer 3. Especially suitable for use as drainage medium 10 in such embodiments are materials selected from a polymeric foam, in which foam opposed outer axially extending surfaces of the foam in the filter element 29 have a skin for providing the barrier layer 2 and capturing layer 3. Other particularly suitable materials are a three-dimensional spacer textile, a three-dimensional knit. Also suitable is a combination of two or more of the aforementioned materials, wherein opposed skin layers of the spacer textile or three-dimensional knit are connected by means of spacer fibers 50 at least a part of which extends in the flow direction of the fluid (F) through the gas filter 20.

Figure 3F:
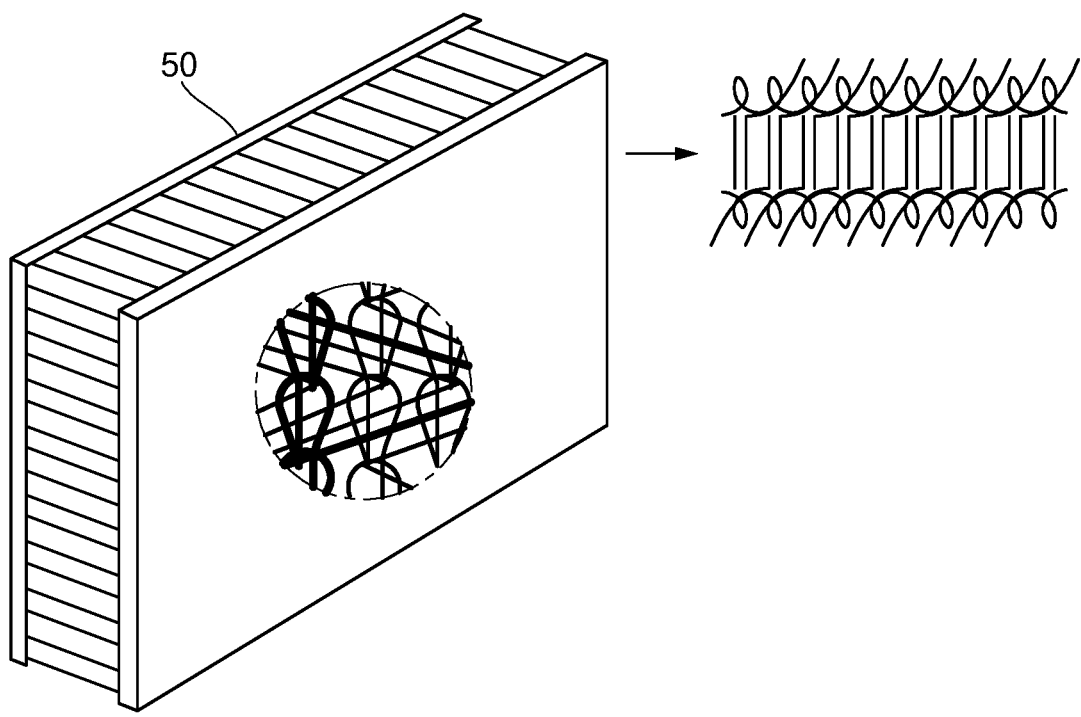

In a spacer textile the spacer fibers 50 (see FIG. 3*f*) can form a connection between a first skin layer 12 that can provide a capturing layer 3 and the opposite skin layer 13 that can provide a barrier layer 2 (see FIG. 2*e*). Through an adequate choice of the spacer fibers 50, a structure having a high mechanical strength and a desired compressibility in thickness direction of the spacer web can be provided. Depending on the application, some compressibility may be desirable, or it may be minimized.

Particularly suitable for use in one or as drainage medium 10 are three dimensional knits as shown in FIG. 3*a*-3*e*. Such knitted fabrics are available as 3-dimensional material, in the form of sheets, but also as cylindrical knitted fabrics. The latter are suitable for immediate use in a cylindrical gas filter 20. The mechanical properties of these knit fabrics are usually similar to those of woven fabrics, or even better. Suitable knitted fabrics are described in, among others, The Karl Mayer Guide to Technical Textiles, p. 4-18. Knitted fabrics offer the advantage that they can be made in a very versatile way, with a more or less open or closed surface, the shape and dimensions of the pores in the internal of the knit can be varied within wide limits by varying the nature of the knitting and/or the distance between the loops, flat knits are possible, as well as tubular or 3-dimensional knits. The width and length can also be controlled within wide limits.

Three-dimensional knits usually have a complex structure, due to the construction of the outer skin layers and the internal part of the knit. The distance between the outer skin layers of a knit is determined by the thickness of the internal structure, this distance can vary within wide limits. The outer layers of a knit usually include a plurality of independent stitches and loops. The loops of the opposite outer layers of the knit are connected to each other by means of connectors forming the inside of the knit. The thickness of such an internal structure is often greater than the thickness of an ordinary flat knitted fabric which is produced in the known manner using the classic warp knitting knitting machines. With more complicated knitted fabrics, the internal layer may also contain weft-like stitches. The opposite outer layers or skins may have the same or a different structure.

By an adequate choice of the material from which the fibers are made, or by impregnating the fibers with a resin or coating with a coating, a fabric or a knit can be fixed in a 3-dimensional structure, for example the structures shown in FIG. 3*a*-3*e*. A knit such as that shown in FIG. 3*e* has a particularly high stability in width direction, the knit shown in FIG. 3*f* also has a particularly high stability in height direction.

Suitable materials for manufacturing three dimensional knits are fibers, designed as multi-filaments or mono-filaments of the materials described below.

Examples of fibrous materials which are particularly suitable for manufacturing a drainage medium 10 of this invention include thermoplastic materials, thermosetting materials, organic or inorganic materials, metallic materials or alloys, blends and chemically modified materials, for example made by drawing, spinning, sewing, cross-linking, melt spinning (for example spin binding, nanofibres, melt-blowing), wet laying, electrospinning, solvent spinning, point bonding, adhesive bonding, continuous fabrics—knitting, casting, co-extrusion etc. Other particularly suitable materials are plastics selected from the group of fibers manufactured in polyolefin, for example polyethylene or polypropylene; polyesters; polyamides, for example nylon 6, nylon 6,6, nylon 12; polyimides; polycarbonate fibers and the like. Metal foams or sintered metal structures can also be used.

In case the outer skin layers of a knit provide the barrier layer 2 and/or the capturing layer 3 respectively, they can be made from the same material or from different materials, the thickness of the yarns from which the outer skin layers are made can be the same or different. The skin layers can be made from one yarn or a combination of several yarns, which may be the same or different yarns.

The internal structure of a knit which provides the distance between the skin layers may itself be composed of one or more layers, which may have the same or a different thickness. The internal structure can be made from the same fibers or yarn as the skin layers or from other fibers or another yarn. The internal structure can be made from one yarn or a combination of several yarns, which may be the same or different yarns. The thickness of the fibers or yarns from which the internal structure is made can be the same or different.

The use of a three-dimensional knit as a drainage medium 10 offers several advantages. A first advantage is that the three-dimensional knit provides three sought-after functionalities for the drainage medium 10; the loops of the knit are extremely suitable for blocking, receiving and guiding droplets of the coalesced disperse phase and thus extremely suitable as skin for capturing coalesced disperse phase coming out of the coalescence medium 5. The loops and channels provide a curved route for guiding the droplets along the drainage surface, and for guiding the coalesced drops that would not immediately have drained towards the drainage medium 10. Another advantage is that a knit has an open structure, and thus is capable of ensuring efficient drainage of coalesced disperse phase which has not been drained along the drainage surface but penetrates the drainage medium 10.

In a further preferred embodiment, the drainage medium 10 is built up from a polymer foam or contains at least one layer of a polymer foam. Various polymer foams can be used, for example polyurethane foam, polyethylene foam, polypropylene foam, polyvinyl chloride foam, polystyrene foam, polycarbonate foam, polyimide foam. Preferably, however, a polyurethane foam is used, a large variety of polyurethane foams is commercially available or can be produced, with numerous possibilities for controlling the internal pore structure, in particular the dimensions of the pores.

A sheet or layer of a polymeric foam can be produced such that the two opposite sides or exterior surfaces form a skin with a pore structure which is more closed than the pore structure of the inner part of the foam layer. The skin will therefore be able to act as barrier layer 2. Within the scope of the present invention, the barrier layer 2 can be built up from a single foam layer or two or more foam layers can be arranged in an adjacent manner. In that case the drainage medium 10 will usually be built up of a foam with a high permeability in the drainage direction. To this end, polymeric foams, in particular polyurethane foams, can be used with a high porosity.

The barrier layer 2 will usually be composed of a polymer foam with a low permeability for the disperse phase. To this end, polymeric foams, in particular polyurethane foams, can be used with an openness of 97%, and a pore diameter between 100.0 and 1500.0 microns, preferably between 700.0 and 1000.0 microns. In a preferred embodiment of this invention, different types of materials can be combined to provide an optimum drainage medium 10. For example, in a preferred embodiment of this invention, a layer of a knitted fabric is combined with a layer of a polymeric foam to provide a drainage layer 1 and a barrier layer 2.

In a practical example, the gas filter 20 of this invention contains a 3-dimensional knit that fulfills the function of drainage layer 1 and barrier layer 2. In another practical example, the gas filter 20 of this invention contains successive layers of a polymeric foam as a drainage medium 10 and a sheet of non-woven fibers as a barrier layer 2. In yet another practical example, the gas filter 20 of this invention contains successive layers of a first foam which functions as a capturing layer 3, a second foam that functions as a drainage medium 10 and a third foam that functions as a barrier layer 2. The porosity, pore size and direction in which the pores drain, is thereby attuned to the function to be fulfilled by the layer as described above.

The displacement of a fluid contaminated with an aerosol, for example oil, for example air, through a gas filter 20 of this invention can be described as follows. The fluid enters the drainage layer 1 of the drainage medium 10 along the first skin 12, usually in a direction extending transversely to the first skin 12. Coalesced drops are drained through the porous core 11, the drainage direction running in the direction of the skin 12, transverse to the flow direction F of the fluid. Purified fluid present in the fluid leaves the drainage layer 1 via the 20 second skin 13, usually in a direction transverse to the second skin 13. The flow direction of the fluid F preferably runs transversely to the first and second skin 12, 13. The drainage direction D will usually run transversely to the flow direction of the fluid F, or in other words in the direction of the layers 1, 2, 3.

In a preferred embodiment of the invention the drainage medium 10 is made of a polymeric foam, the capturing layer 3 and the barrier layer 2 being provided by a skin on opposite sides of a porous foam core serving as drainage medium 10 and drainage layer 1. In another preferred embodiment, the at least one drainage layer 1 is made of a spacer fabric, and the capturing layer 3 and the barrier layer 2 are formed in a polymeric foam. In another preferred embodiment the at least one drainage layer 1 is made of a sheet of a polymer foam, and the capturing layer 3 and the barrier layer 2 are respectively embodied in a sheet of a polymeric foam. In yet another preferred embodiment, the drainage layer 1 is made of a spacer fabric, the capturing layer 3 is made of a spacer fabric and the barrier layer 2 is formed in a sheet of a polymeric foam. It will be clear that additional combinations of spacer fabrics and foams as described in this application are possible and fall within the scope of protection of this patent application.

FIG. 7 shows a compressor provided with an inlet 230 for supplying air to be compressed to a compressor element 210, and a gas filter 220 according to the present invention as described above, as an oil separator. Such an oil separator is usually placed immediately behind the outlet of the compressor, is directly coupled thereto and is intended for separating larger amounts of oil present in the compressed air coming from the compressor. Compressed air coming from a compressor usually contains oil in a concentration between 10 mg/m3 air and 8000 mg/m3 air.

The invention is further elucidated with reference to the examples below.

The fibrous materials described below were tested as coalescence filters for purifying oil-contaminated air as described in ISO 12500-1 and ISO 8573-2. The initial oil concentration was 10 mg/me.

EXAMPLE

An oil-aerosol pressure filter was contacted with an air stream containing between 9 and 10 mg/m$^3$ of oil aerosol, with an air supply velocity of 0.35 m/s and a relative pressure of 7 bar. The filter element contained a coalescence medium made of glass fiber and a three-dimensional knitted fabric as drainage medium. The pressure drop over the filter material as such amounted to 51 mbar, the total pressure drop across the oil-aerosol gas filter was 242 mbar, oil carry over was 0.004 mg/m$^3$, Comparative experiment.

Example 1 was repeated, but a felt was used instead of a 3D knit. The pressure drop across the filter material as such was 49 mbar, the total pressure drop across the oil-aerosol gas filter was 290 mbar, oil carry over was 0.023 mg/m$^3$,

TABLE 1

Suitable thicknesses for the drainage layer 1, the barrier layer 2 and the capturing layer 3, as well as typical pore sizes for these layers.

| | Pore size (μm) | | | Thickness (mm) | | |
|---|---|---|---|---|---|---|
| | A | B | C | A | B | C |
| drainage layer 1 | 5-20000 | 25-10000 | 100-2500 | 0.5-20 | 1-10 | 2-6 |
| barrier layer 2 | 5-1000 | 25-750 | 100-500 | 0.01-20 | 0.1-4 | 0.1-2 |
| capturing layer 3 | 5-20000 | 25-10000 | 100-2500 | 0.1-20 | 0.1-4 | 0.1-2 |

The invention claimed is:

1. A gas filter for coalescing at least one dispersed liquid phase present in a gas, the gas filter comprising:

an inlet for supplying the gas to a filter element present in the gas filter, which filter element comprises a coalescence medium for coalescing the at least one dispersed phase during a displacement of the gas through the coalescence medium in a flow direction, wherein the filter element downstream of the coalescence medium comprises a drainage medium for draining the at least one coalesced dispersed phase leaving the coalescence medium in a drainage direction which is transverse to the flow direction, wherein the filter element is composed of a single package of the coalescence medium, the drainage medium and a barrier layer, wherein the barrier layer is located downstream of the coalescence medium, wherein the coalescence medium and the barrier layer are held at a distance from each other by one or more spacers extending in the flow direction to provide a drainage layer in the drainage medium between the barrier layer and a surface of the coalescence medium facing the barrier layer, the coalescence medium, the drainage medium and the barrier layer being layer-like materials positioned adjacent to each other, wherein pores in the drainage medium have an average pore diameter greater than an average pore diameter of pores of the barrier layer and greater than an average pore diameter of pores of the coalescence medium, wherein the drainage medium has a thickness greater than a thickness of the coalescence medium and a thickness of the barrier layer, wherein the drainage medium contains the drainage layer with a drainage surface for receiving and draining the at least one coalesced dispersed phase, the drainage surface facing the coalescence medium, wherein the drainage medium contains an anisotropic porous material having a higher air permeability than the barrier layer, and wherein the barrier layer is positioned downstream of the drainage medium, the drainage medium having a permeability for the at least one coalesced dispersed phase in the drainage direction which is higher than a permeability in the flow direction of the fluid.

2. The gas filter according to claim 1, wherein the drainage medium further comprises a capturing layer for capturing the coalesced dispersed phase from the coalescence medium and guiding the coalesced dispersed phase to the drainage layer, wherein the capturing layer contacts a surface of the coalescence medium which faces the drainage layer.

3. The gas filter according to claim 2, wherein the capturing layer contains a material selected from a knitted fabric, a crocheted material, a tufted material, a woven fabric or a combination of two or more of the aforementioned materials.

4. The gas filter according to claim 1, wherein the pores in the drainage layer have an average pore diameter which is greater in the drainage direction than in the flow direction.

5. The gas filter according to claim 1, wherein a maximum of 10% of the pores of the drainage medium have a diameter which is smaller than 5 µm, and at least 50% of the pores of the drainage medium have an average diameter which is greater than 500 µm.

6. The gas filter according to claim 1, wherein the pores in the drainage medium have a diameter which ranges between 5.0 and 20000.0 µm.

7. The gas filter according to claim 1, wherein the drainage layer is configured to have an average pore diameter of the pores in the drainage direction greater than an average droplet size of the at least one coalesced dispersed phase.

8. The gas filter according to claim 1, wherein the drainage medium has a thickness between 0.5 and 20.0 mm.

9. The gas filter according to claim 2, wherein the barrier layer has a lower permeability in flow direction for the coalesced dispersed phase than the drainage medium and the capturing layer.

10. The gas filter according to claim 1, wherein the barrier layer comprises a material with pores whose diameter is situated between 5.0 and 1000.0 µm.

11. The gas filter according to claim 1, wherein the barrier layer has a thickness between 0.01 and 20.0 mm.

12. The gas filter according to claim 2, wherein the pores of the capturing layer have a diameter in the range of 5.0 to 20000.0 µm.

13. The gas filter according to claim 2, wherein the capturing layer has a thickness between 0.1 and 20.0 mm.

14. The gas filter according to claim 1, wherein the drainage medium comprises a material selected from a knitted fabric, a crocheted material, a tufted material, a fabric, a polymeric foam, or a combination of two or more of the aforementioned materials, wherein at least a portion of the surface is facing and preferably in contact with the surface of the coalescence medium facing the drainage medium.

15. The gas filter according to claim 1, wherein the drainage medium comprises a material selected from the group consisting of a spacer textile, a spacer fabric, a spacer knitting, a polymer foam, or a combination of two or more of the aforementioned materials.

16. The gas filter according to claim 2, wherein the capturing layer comprises a material selected from a knitted fabric, a crocheted material, a tufted material, a woven fabric, a polymeric foam, or a combination of two or more of the aforementioned materials.

17. The gas filter according to claim 16, wherein the capturing layer comprises a plurality of protrusions which extend towards the coalescence medium.

18. The gas filter according to claim 16, wherein at least a part of fibers forming the capturing layer extend in the drainage direction.

19. The gas filter according to claim 2, wherein the drainage medium comprises a polymer foam, in particular a polyurethane foam, with a first foam layer for providing the drainage layer, the drainage layer containing pores which are open in the drainage direction, wherein on a downstream side of the drainage medium a second layer of a polymeric foam is provided for providing the barrier layer containing pores which are closed in the flow direction of the gas.

20. A method for separating a dispersed phase present in a fluid from a carrier using the gas filter according to claim 1, said method comprising the steps:
supplying the fluid to the gas filter with the coalescence medium for coalescing the at least one dispersed phase,
contacting the at least one coalesced dispersed phase when leaving the coalescence medium through a downstream exit surface of the coalescence medium, with the drainage medium contained in the gas filter,
draining the coalesced dispersed phase along the drainage surface or through the drainage medium, and
collecting the carrier present in the fluid downstream of the drainage medium.

\* \* \* \* \*